United States Patent [19]
Kaufmann

[11] 3,739,609
[45] June 19, 1973

[54] BICYCLE LOCK
[76] Inventor: Edward A. Kaufmann, 2785 N. Speer Boulevard, Denver, Colo. 80211
[22] Filed: Feb. 4, 1972
[21] Appl. No.: 223,419

[52] U.S. Cl. .................. 70/234, 211/5, 248/121, 248/361 R
[51] Int. Cl. ............................................ E05b 71/00
[58] Field of Search ............... 70/234, 58; 52/169, 52/296; 211/4, 5, 17, 22; 248/121, 119, 73, 70, 69; 224/42, 03 B

[56] References Cited
UNITED STATES PATENTS
2,635,857  4/1953  Banister ............................ 256/19
2,805,860  9/1957  Littig ................................ 272/73
2,926,442  3/1960  Reimel .............................. 40/125

FOREIGN PATENTS OR APPLICATIONS
8,249  0/1898  Great Britain ....................... 70/234

Primary Examiner—Albert G. Craig, Jr.
Attorney—Richard D. Law

[57] ABSTRACT

A bicycle lock assembly, which is secured to the ground or bicycle stand, having a strap metal retainer, locks around the bicycle frame and pedal sprocket, making unauthorized removal of the bicycle extremely difficult.

7 Claims, 6 Drawing Figures

PATENTED JUN 19 1973  3,739,609
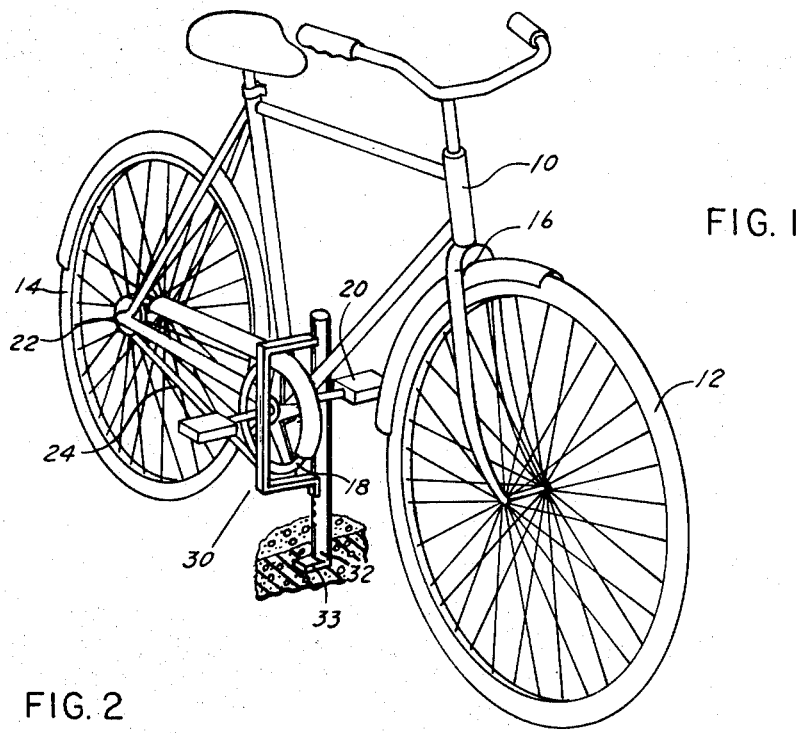
FIG. 1
FIG. 2
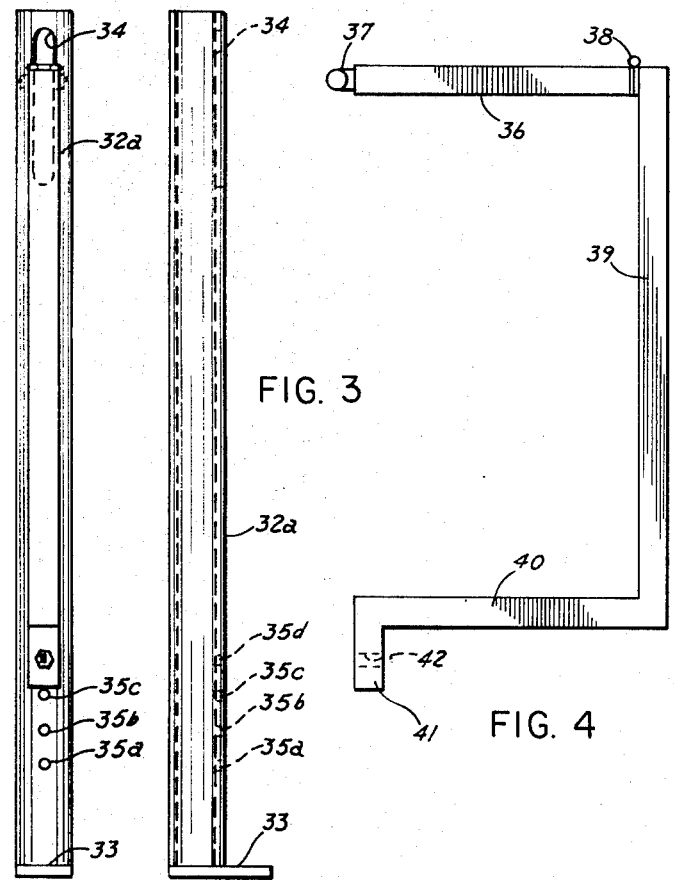
FIG. 3
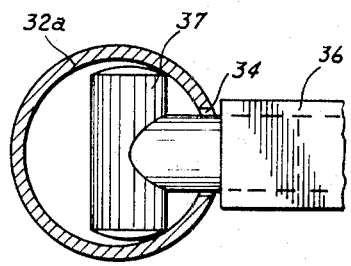
FIG. 5
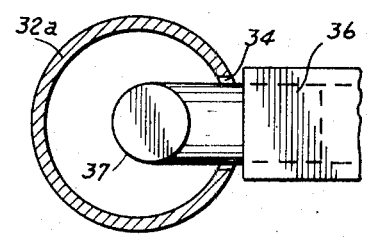
FIG. 6
FIG. 4

BICYCLE LOCK

As the use of bicycles in the United States and elsewhere in the world increases, the theft of bicycles has, also, increased. Conventional bicycle locks include spoke padlocks, cable and lock devices, chain and padlock devices, etc., all intended to prevent riding the bicycle when the lock is in place. Normally, such devices merely lock one of the wheels of the bicycle to a part of the frame to prevent rotation of the wheel. The padlocks, cables, or chains are, however, easily cut with small bolt cutters, hacksaws, or the like. This type of device generally discourages many juvenile would-be thieves, however, it does not prevent theft by professionals who specialize in bicycle perloining, and it certainly does not discourage the thief who carries away the bicycle and subsequently disengages the locking mechanism.

Included among the objects and advantages of the present invention is a lock system arranged to secure a bicycle in position and prevent theft thereof.

Another object of the invention is to provide a rugged lock arrangement for a bicycle which is not easily destroyed and removed from the bicycle.

Yet another object of the invention is to provide a bicycle lock which secures a bicycle in upright position acting both as a lock and as a non-movable stand.

These and other objects and advantages of the invention may be readily ascertained by referring to the following description and appended illustrations in which:

FIG. 1 is a perspective view of a bicycle securely locked with a device according to the invention;

FIG. 2 is a front elevational view of a lock according to the invention;

FIG. 3 is a side elevational view of one portion of the lock of the invention;

FIG. 4 is an enlarged detail view of another portion of the invention showing a sprocket lock arrangement;

FIG. 5 is a top plan view, in section, of the securing arrangement of the sprocket lock of FIG. 4; and FIG. 6 is a top plan view of the sprocket lock securing means turned at 90° to that of FIG. 5 for removing the same from an upright stand.

In the device shown in FIG. 1, a bicycle includes a conventional frame 10, front wheel 12, and rear wheel 14. The front wheel is mounted in a wheel fork 16 in conventional manner and the unit is propelled by a conventional chain and sproket drive. The chain drive includes a conventional sprocket 18 on which is mounted conventional pedals 20 and a rear sprocket 22 driven by the front sprocket by means of an endless chain 24. The locking unit of the invention is illustrated as secured to the ground, and the unit, shown in general by numeral 30, extends upwardly from the ground providing means for securing the bicycle around the pedal sprocket 18 and holding the bicycle in upright position.

The locking unit of the invention includes an upright member 32, which in one form includes a foot 33 which may be secured to a cement base or the like or it may be otherwise secured to a base for securing the upright member in position. In one form, the upright may be an angle or a heavy strap, and in another form as shown in FIGS. 1 through 6 the upright is a pipe or tube 32a. The tube 32a is provided with a slot 34 (FIG. 2) extending from near the top downwardly a substantial distance to permit the lock end of a sprocket covering bar to be inserted in the slot. A series of holes 35a, 35b and 35c are provided near the bottom of the unit for locking the sprocket cover bar to the upright 32a.

The sprocket bar includes an arm 36 having a T-shaped locking end 37 and an attached hinge 38 on the end opposite the T-head. Attached to the other half of the hinge is an L-shaped bar 39 provided with a lateral base 40 and an end member 41 normal, thereto the end 41 is provided with an opening or bore 42 therein. The hinge 38 permits angular movement of the member 39 in relation to the bar 36 which facilitates the mounting of the unit around a bike sprocket.

For use, a bicycle is moved into position along-side a secured upright, for example 32, FIG. 1. The sprocket lock bar is held in position in the upright bar by the T-head 37 into the slot 34, shown in FIGS. 5 and 6, so that it cannot be released whether the head is sideways of or in alignment with the slot in the upright 32. The bar 39 is then swung upwardly into generally horizontal position, passed through the frame of the bicycle and then dropped down over and around the pedal sprocket, as shown in FIG. 1. The elongated slot 34 permits the sprocket bar to be moved up and down to accommodate different heights of bicycles. The holes 35a through 35d permit the sprocket lock bar to be moved into position so that a flush, screw-type lock may be passed through the opening 42 into one of the openings 35, and, thereby, secure the bicycle onto the upright. With the sprocket lock bar in place through the frame and over a sprocket, one pedal is extended rearwardly while the other is forwardly. This prevents removal of the bicycle from the lock either forwardly or rearwardly.

The tubular metal, the bars and the strap, are made of heavy gauge, high strength steel so that they are not easily cut or broken for removal of the bicycle. The lock bar may be replaced by a heavy cable in place of the hinged bar. With the cable, the one end is secured, as by a ball, inside the tube extending through the slot to permit it to move up and down. The other end of the cable is secured to a flat bar (similar to 41) with a hole to permit the use of the lock. The cable may be easily passed through the bicycle frame, around the sprocket and the free end locked to the upright post. The upright may be secured in place as by being placed in concrete by various means, as by using a foot 33, or it may be an elongated pole buried in the cement and thereby secured in position. A number of such poles may be placed one along side the other to provide a bike rack, and the combination forming a lock system for each stanchion for the bicycles. Each bicycle rider would, preferably, have his own screw-type lock, which is a small unit and easily carried with the bicycle rider. This provides a secure system controlled by the owners. It is easily seen that the rack is simple, inexpensive and extremely effective in the prevention of theft in bicycles.

I claim:

1. A bicycle lock assembly comprising
   a. an upright member arranged to be secured to supporting ground construction;
   b. an elongated member inclusive of means secured by one end at the upper end of said upright member for variable placement positioning, whereby said elongated member may be placed over the frame and pedal sprocket of a bicycle placed against said upright member; and c. means cooperative with free end of said elongated member for locking the free end of said elongated member to said upright member and thereby secure a bicycle in place.

2. A bicycle lock assembly according to claim 1 wherein said upright is tubular.

3. A bicycle lock assembly according to claim 2 wherein said elongated member is a U-shaped member having an enlarged head, and said upright member includes an elongated slot for accommodating and enlarged head.

4. A bicycle lock assembly according to claim 3 wherein said U-shaped member includes a hinge permitting angular movement of the upper leg in relation to the remainder of said U-shaped member.

5. A bicycle lock assembly according to claim 1 wherein said elongated member is a cable.

6. A bicycle lock assembly according to claim 1 wherein said upright member includes a plurality of locking positions cooperative with said free end of said elongated member.

7. A bicycle lock assembly according to claim 6 wherein said locking means includes a bore in the lower end of said elongated member alignable with one hole of a series of holes in said upright for accepting a locking assembly.

* * * * *